July 5, 1966   R. L. C. E. FLAMENT   3,259,277
DRIVE MECHANISM FOR GRAIN DRILLS AND THE LIKE
Filed Dec. 21, 1964   5 Sheets-Sheet 1
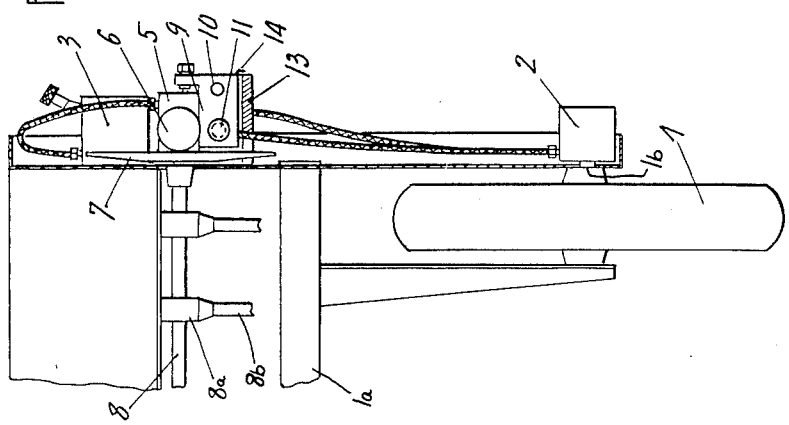
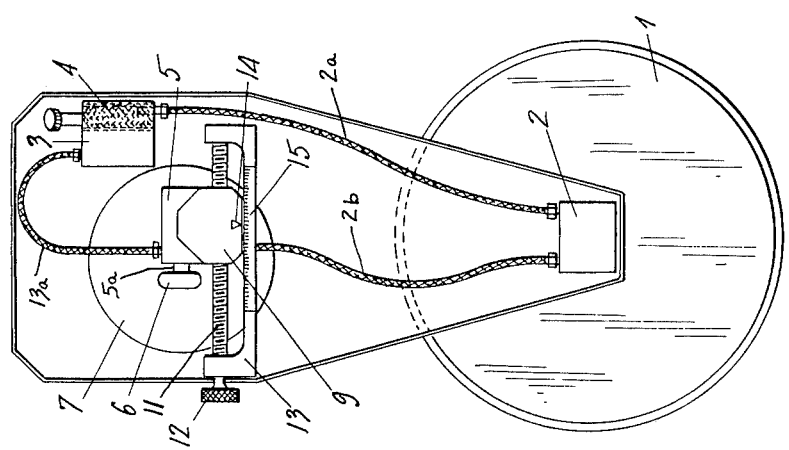
*INVENTOR.*
ROGER L.C.E. FLAMENT
BY
ATTORNEY

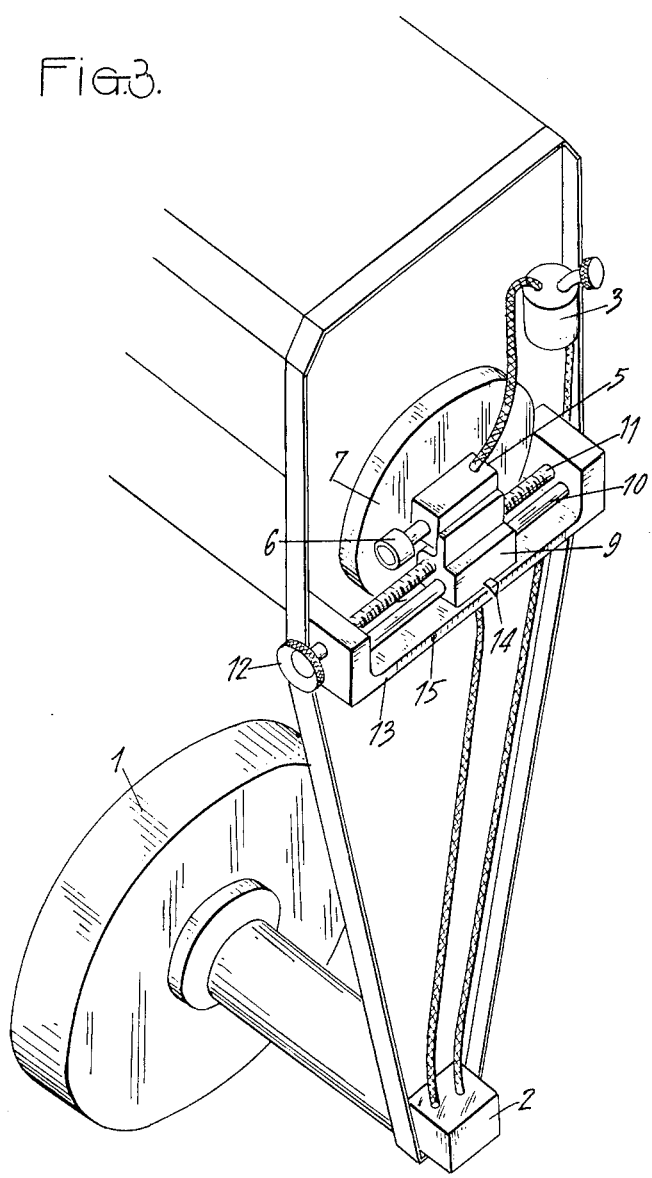

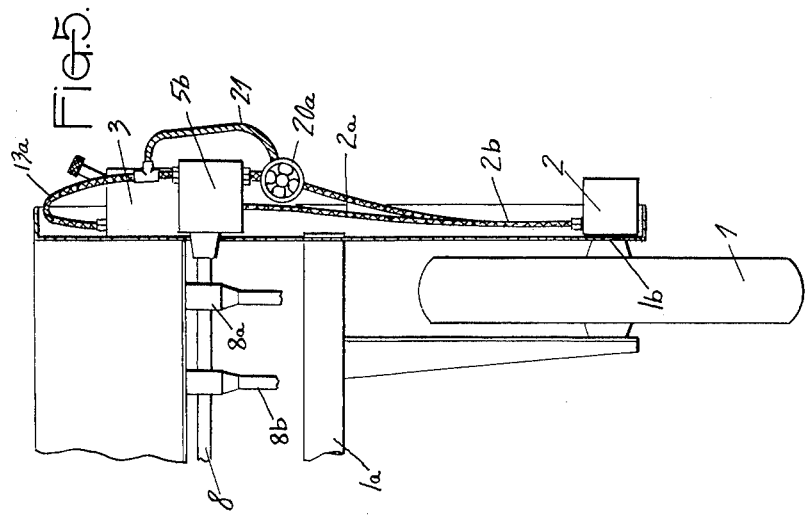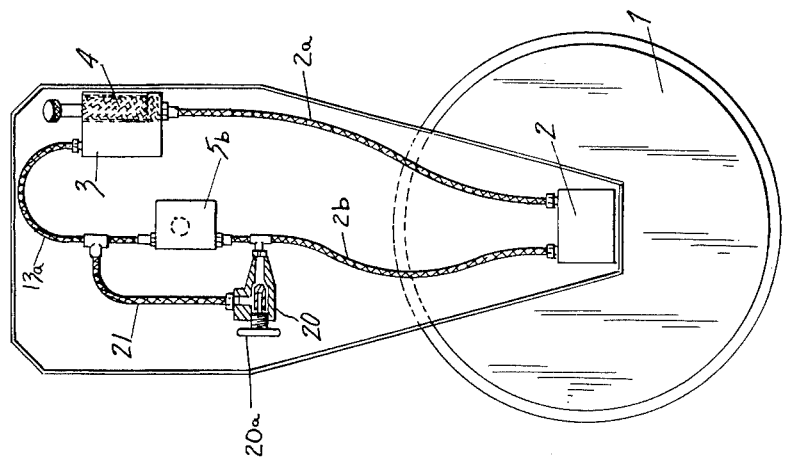

July 5, 1966 R. L. C. E. FLAMENT 3,259,277
DRIVE MECHANISM FOR GRAIN DRILLS AND THE LIKE
Filed Dec. 21, 1964 5 Sheets-Sheet 4
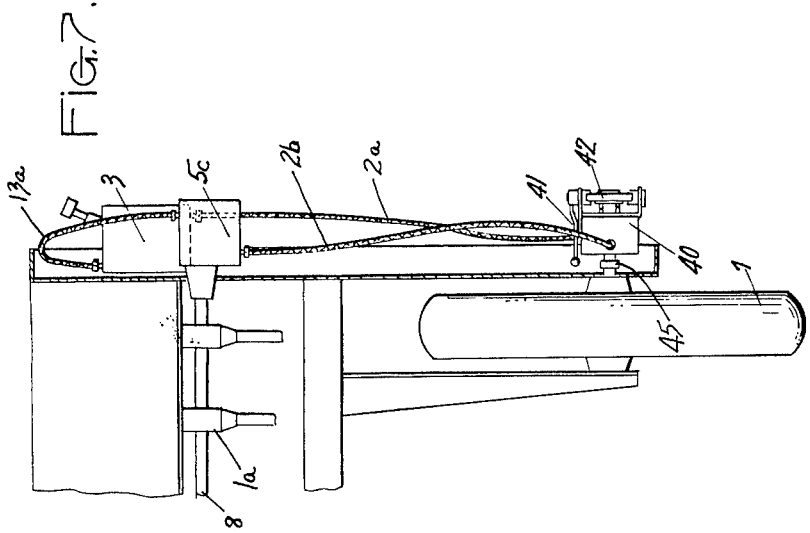
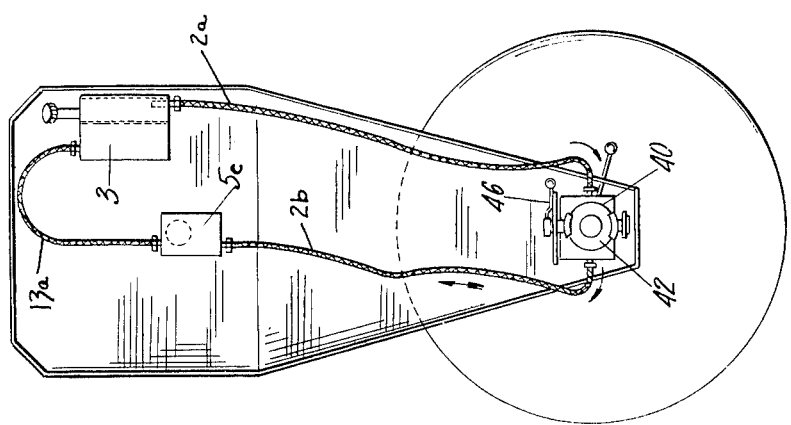
INVENTOR.
ROGER L.C.E. FLAMENT
BY
ATTORNEY

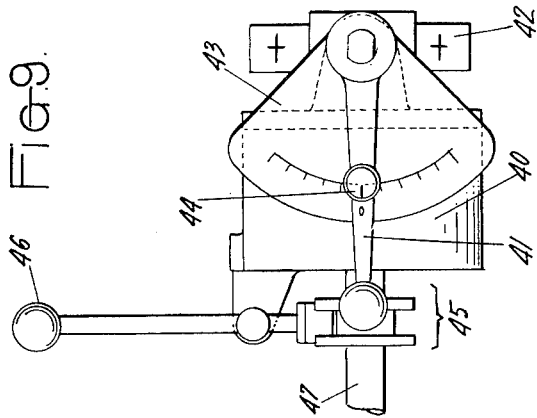
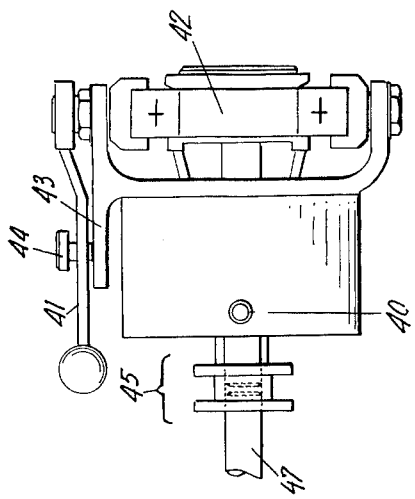

United States Patent Office 3,259,277
Patented July 5, 1966

3,259,277
DRIVE MECHANISM FOR GRAIN DRILLS
AND THE LIKE
Roger Lucien Camille Edouard Flament, 18 Rue des
Ursulines, Tourcoing, France
Filed Dec. 21, 1964, Ser. No. 435,394
7 Claims. (Cl. 222—177)

This invention relates to agricultural implements and particularly to material dispensers usch as grain drills and the like. More specifically, the invention concerns novel drive means for such an implement.

The present invention is particularly applicable to the type of material dispenser wherein a hopper containing seed or other material has means associated herewith which may dispense the material at different speeds to regulate the amount of material discharged from the hopper. The means previously utilized for this purpose have had the disadvantages of being crude and not allowing for the range of adjustment required in modern high speed farming operations.

Therefore, an object of this invention is the provision of novel power transmission means for operating the discharge means of an agricultural dispenser such as a grain drill or the like, wherein the above mentioned disadvantages are voided.

Another object of the invention is the provision, in a grain drill or the like having a hopper carried by a wheel supported frame, of novel means for transmitting power from the supporting wheel to the hopper to control the flow of seed or other material therefrom.

Another object of the invention is the provision, in a wheel supported grain drill or the like, of hydraulically operated means for driving the dispensing mechanism of the drill from the supporting wheel to accommodate fine adjustments in the rate of discharge of said material.

Other objects and advantages of the invention will become clear from the following detailed description when read in conjunction with the accompanying drawings, wherein:

FIGURE 1 is an end elevation of a grain drill incorporating the features of this invention;

FIGURE 2 is a front view of one end of the drill shown in FIGURE 1;

FIGURE 3 is an enlarged perspective view of the structure shown in FIGURES 1 and 2;

FIGURE 4 is an end view similar to FIGURE 1 illustrating an modified form of the invention;

FIGURE 5 is a front elevation of the structure shown in FIGURE 4;

FIGURE 6 is an end elevation similar to FIGURES 1 and 4 showing another modified form of the invention;

FIGURE 7 is a front view of the structure shown in FIGURE 6;

FIGURE 8 is an enlarged elevation of a portion of the drive transmission means shown in FIGURES 6 and 7; and FIGURE 9 is a plan view of the structure shown in FIGURE 8.

In the drawings the numeral 1 designates one of the supporting wheels of a grain drill, which it may be understood is transversely elongated and supported by laterally spaced wheels and preferably propelled by or mounted upon a tractive vehicle. Many of the constructional details of the drill are conventional and well known and form no part of this invention.

The wheel 1 is mounted on the frame 1a, and its axle 1b carries a fluid pump 2, of any well known type, receiving oil through a conduit 2a from a supply tank 3, mounted on the drill frame and having therein a filter 4.

As shown in FIGURES 1 to 3, fluid from pump 2 is delivered through another conduit 2b to a hydraulic motor 5, which may also be of any well known type having a shaft 5a upon which is mounted a wheel 6 having a periphery of rubber or other suitable material.

Wheel 6 frictionally engages a disk or plate 7 secured to the end of distributor drive shaft 8 with which are associated dispensing mechanisms 8a adapted to discharge material from the drill through tubes 8b at a rate determined by the rotary speed of shaft 8.

In FIGURES 1 to 3 the hydraulic motor 5 is illustrated as mounted upon a movable member or trolley 9, slidably mounted on a guide rod 10 carried by a supporting member 13 secured to the implement frame.

The trolley 9 is provided with a threaded opening receiving a threaded rod 11 mounted in member 13 and having a knob 12 at one end for revolving rod 11 and shifting the trolley 9 and motor 5 in a direction to vary the radial position of engagement of roller or wheel 6 with the disk 7. By radially shifting the position of roller 6 with respect to disk 7 the rotary speed of drive shaft 8 and therefore the amount of material discharged through dispensing mechanisms 8a is infinitely variable. A return conduit 13a connects motor 5 with the supply tank 3 for returning fluid thereto.

For ease in adjusting the flow of material from the implement hopper, a pointer 14 is mounted on shiftable member 9, and graduations 15 are provided on member 13 to indicate the position of wheel 6 relative to disk 7 and, therefore, the rotary speed of dispenser drive shaft 8.

In FIGURES 4 and 5, the oil pump 2 is again actuated by wheel 1 to draw oil from tank 3 through filter 4. Fluid under pressure is discharged from the pump and delivered through conduit 2b to the hydraulic motor 5b mounted on the implement frame. An adjustable device for regulating the delivery of fluid to motor 5b is provided in the form of a flow limiter 20 interposed in conduit 2b and connected by another conduit 21 to the tube 13a. Member 20 is of conventional construction and serves as an adjustable by-pass to divert selected quantities of oil past the motor and return it to the supply tank 3. Adjustment of the quantity of fluid by-passed is made by manipulating the knob 20a. This control of the fluid delivered to motor 5b determines the rotary speed of dispenser drive shaft 8.

In the modification shown in FIGURES 6 to 9, the pump 40 is of the variable output type and may be generally of any well known construction. The pump 40 is operated in the same manner as previously described by supporting wheel 1, and also draws oil from supply tank 3 through conduit 2a and delivers fluid under pressure through conduit 2b to a hydraulic motor 5c mounted on the implement frame.

The variable output of pump 40 is regulated by manipulating lever 41, best shown in FIGURES 8 and 9, the variable inclination of plate 42, which conditions the variable output of the pump depending upon the position of the lever 41 with respect to a graduated segment 43, affixed to the pump housing. A screw 44 enables the lever 41 to be secured and thereby immobilizes plate 42 in a predetermined position.

A clutch 45, controlled by a lever 46, is provided on the shaft 47 of the pump. In the case of a trail behind implement supported only on the wheels 1, the lever 46 is manipulated to engage or disengage clutch 45. However, in the case of a direct connected or tractor mounted implement, inasmuch as the pump 40 is operated by contact of wheel 41 with and rotation thereof on the ground, lifting of the implement stops the wheel and the pump.

It should be observed that the output of pump 40, as shown in FIGURE 6, is zero, plate 42 being perpendicular to the drive shaft 47. The output of the pump is at maximum value when the inclination of the plate with respect to said shaft is at a maximum.

It is believed that the construction and operation of the novel hydraulic drive transmission mechanism for operating the dispensing mechanism of a grain drill or the like should be clearly understood from the foregoing description. It should likewise be understood that the invention has been described in its preferred embodiments and that further modifications may be made therein without departing from the spirit of the invention or the scope of the appended claims.

The embodiments of the invention for which an exclusive property or privilege is claimed are defined as follows:

1. In a mobile implement having mechanism for dispensing material including a frame carrying a hopper for said material, a wheel supporting the frame and a drive shaft rotatably mounted on the frame operatively connected to the hopper for discharging material therefrom, the combination of means for transmitting drive from said wheel to said drive shaft to control the rate of rotation thereof and the amount of material dispensed from said hopper comprising, a source of fluid on said frame, a pump associated with said wheel and operatively connected thereto to be driven thereby, a fluid operated motor receiving fluid under pressure from said pump mounted on the frame and operatively connected to said drive shaft for driving the latter, and adjusting means operatively connected to said motor for varying the speed at which the latter drives said shaft.

2. The invention set forth in claim 1, wherein a friction wheel is carried by said motor and driven thereby on an axis normal to the axis of said shaft and a disk mounted on said drive shaft is frictionally engageable with said friction wheel.

3. The invention set forth in claim 2, wherein said motor is movably mounted on the frame and adjusting means carried by the frame is operatively connected to said motor for shifting the latter and said friction wheel transversely of said drive shaft to radially vary the position of the friction wheel relative to said disk.

4. The invention set forth in claim 3, wherein said adjusting means is a screw rotatably mounted on the frame and operatively connected to said motor to shift the latter upon rotation of the screw.

5. The invention set forth in claim 1, wherein said adjusting means is a fluid flow control mechanism associated with said motor in the path of fluid from said pump to vary the amount of fluid delivered to said pump.

6. The invention set forth in claim 5, wherein said flow control mechanism is operative to divert a part of the fluid from the pump to said motor and means are provided for returning the diverted fluid to said source.

7. The invention set forth in claim 1, wherein said pump is a variable output pump adapted to deliver fluid at selected rates to said motor to vary the speed at which the latter drives said drive shaft.

References Cited by the Examiner

UNITED STATES PATENTS

| 2,587,085 | 2/1952 | Anderson | 222—177 X |
| 2,668,638 | 2/1954 | Joy | 222—177 X |

RAPHAEL M. LUPO, *Primary Examiner.*

C. CARTER, *Assistant Examiner.*